US008600870B2

(12) United States Patent
Milana

(10) Patent No.: US 8,600,870 B2
(45) Date of Patent: Dec. 3, 2013

(54) DISTRIBUTED SCORING OF DATA TRANSACTIONS

(75) Inventor: Joseph Philip Milana, San Diego, CA (US)

(73) Assignee: Fair Isaac Corporation, San Jose, CA (US)

( * ) Notice: Subject to any disclaimer, the term of this patent is extended or adjusted under 35 U.S.C. 154(b) by 1133 days.

(21) Appl. No.: 11/927,141

(22) Filed: Oct. 29, 2007

(65) Prior Publication Data

US 2009/0112752 A1 Apr. 30, 2009

(51) Int. Cl.
*G06Q 40/00* (2012.01)

(52) U.S. Cl.
USPC .......................................................... 705/38

(58) Field of Classification Search
None
See application file for complete search history.

(56) References Cited

U.S. PATENT DOCUMENTS

| | | | | |
|---|---|---|---|---|
| 5,461,699 A | * | 10/1995 | Arbabi et al. | 706/21 |
| 5,625,751 A | * | 4/1997 | Brandwajn et al. | 706/20 |
| 6,119,112 A | * | 9/2000 | Bush | 706/25 |
| 6,321,205 B1 | * | 11/2001 | Eder | 705/7.37 |
| 6,516,308 B1 | * | 2/2003 | Cohen | 706/12 |
| 6,783,065 B2 | * | 8/2004 | Spitz et al. | 235/380 |
| 6,803,933 B1 | * | 10/2004 | Staelin et al. | 347/131 |
| 7,165,037 B2 | * | 1/2007 | Lazarus et al. | 705/10 |
| 7,383,239 B2 | * | 6/2008 | Bonissone et al. | 706/46 |
| 7,401,057 B2 | * | 7/2008 | Eder | 706/20 |
| 7,403,922 B1 | * | 7/2008 | Lewis et al. | 705/38 |
| 2006/0143071 A1 | * | 6/2006 | Hofmann | 705/10 |
| 2007/0027919 A1 | * | 2/2007 | Mastel | 707/104.1 |
| 2009/0099959 A1 | * | 4/2009 | Liao et al. | 705/38 |

\* cited by examiner

*Primary Examiner* — Thomas Dixon
*Assistant Examiner* — Gerald Vizvary
(74) *Attorney, Agent, or Firm* — Mintz, Levin, Cohn, Ferris, Glovsky and Popeo P.C.

(57) ABSTRACT

A data transaction is associated with a plurality of remote data sources so that a score may be generated that characterizes the transaction. The remote data sources are polled to obtain partial scores which can be used by a decisioning system to score the transaction. In some implementations, different scoring models may be used so that the data source is notified which scoring model to use when generating the partial score. Related techniques, apparatus, systems, and articles are described.

25 Claims, 5 Drawing Sheets

DISTRIBUTED SCORING OF DATA
TRANSACTIONS

TECHNICAL FIELD

The subject matter described herein relates to techniques for scoring data transactions such as financial transactions.

BACKGROUND

Decisioning systems are being increasingly used to characterize electronic data transactions such as electronic payments (e.g., credit cards, debit cards, gift cards, etc.) as well as credit analyses (e.g., FICO scores, credit reports, etc.). Such characterizations can range from a qualitative score to a binary yes/no decision (e.g., approve or deny a transaction) and can be based on information obtained from a plurality of data feeds. As the number of data feeds increases, network bandwidth is consumed, thereby resulting in delays in scoring as well as increasing processing requirements at the decisioning system.

SUMMARY

In one aspect, a request to score a data transaction pertaining to a financial transaction is received. Thereafter, the data transaction is associated with a plurality of remote data sources. Each of these remote data sources is polled to obtain partial scores characterizing the data transaction. These partial scores are then used to score the data transaction.

The scoring methodology can be, for example, a general linear model in which Score=f($\Sigma\chi_i$) where $\chi_i$ is the partial score associated with each data source. The scoring methodology can alternatively comprise a neural network scoring model in which the partial scores are used to populate activation functions of hidden nodes in the neural network scoring model. The scoring methodology can alternatively comprise a support vector machine scoring model. The score can be generated, for example, by a decisioning system.

The data transaction can pertain to any variety of transactions ranging from, for example, payment card (e.g., debit card, credit card, etc.) transactions to transactions characterizing creditworthiness of an entity, and the like.

In some implementations, the transaction can be scored before all of the partial scores are received from the remote data sources. Such an arrangement can be useful in cases in which certain data sources are not reliable or if a sufficient number of partial scores have been received to score the data transaction.

In order to confirm the partial scores, raw modeling data can be received from at least one of the plurality of data sources so that the partial scores generated by the data sources sending the raw modeling data can be compared with test values generated using the raw modeling data in order to verify the score.

In an interrelated aspect, a request is received to score a data transaction. The data transaction is then associated with a plurality of remote data sources and at least one scoring model. Data is then sent to the associated remote data sources characterizing the data transaction, identifying the at least one associated scoring model, and requesting transmission of partial scores characterizing the data transaction generated by the at least one associated scoring model. Thereafter, partial scores are received from the associated remote data sources generated by the at least one associated scoring model. The partial scores can then be used to score the data transaction.

In a further interrelated aspect, a request to score a data transaction is received. Thereafter, the data transaction is associated with a plurality of remote data sources so that each of the remote data sources can be polled to obtain partial scores characterizing the data transaction. The obtained partial scores are then used to populate activation functions of hidden nodes in a neural network scoring model. The data transaction can then be scored based on an output of the neural network scoring model.

In still a further interrelated aspect, a request to score a data transaction is received. The data transaction is associated with a plurality of remote data sources which are polled to obtain partial scores characterizing the data transaction. These obtained partial scores are used to generate outputs of comparison nodes in a support vector machine scoring model. Thereafter, the data transaction can be scored based on an output of the support vector machine scoring model.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. By distributing the scoring among various data feeds, network bandwidth consumption is reduced while leveraging data providers' processing resources to perform a significant fraction of the calculations required to transform raw data into a model score. Moreover, an amount of time required to reach an ultimate score can be significantly reduced.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
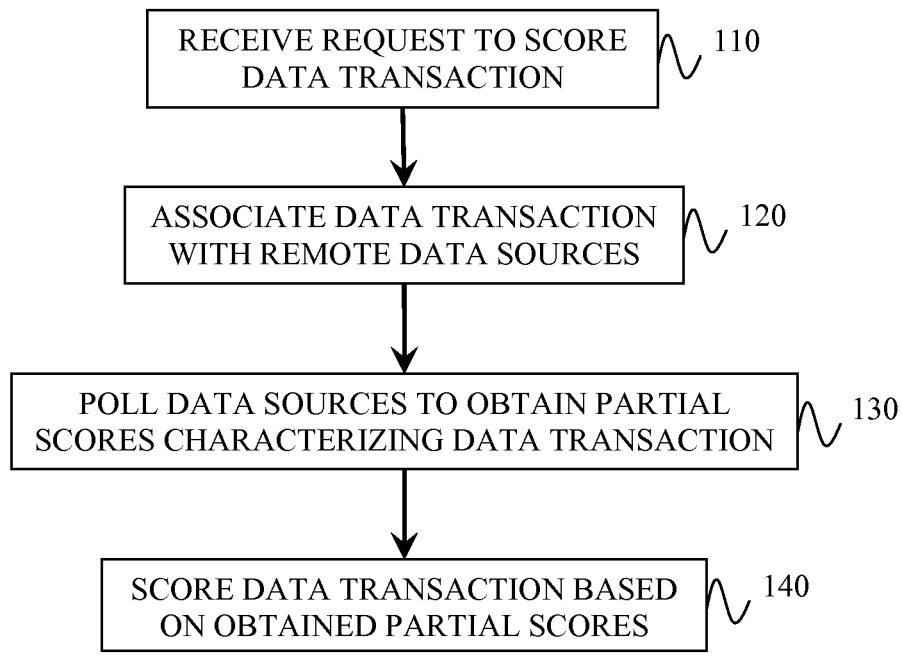
FIG. 1 is a process flow diagram illustrating a distributed scoring technique in which partial scores are generated by a plurality of data sources.

FIG. 1 is a process flow diagram illustrating a method 100, in which, at 110, a request to score a data transaction is received. Thereafter, the data transaction is associated, at 120, with a plurality of remote data sources. These remote data sources can be polled, at 130, to obtain partial scores characterizing the data transaction that allow the data transaction, at 140, to be scored.

Figure 2:
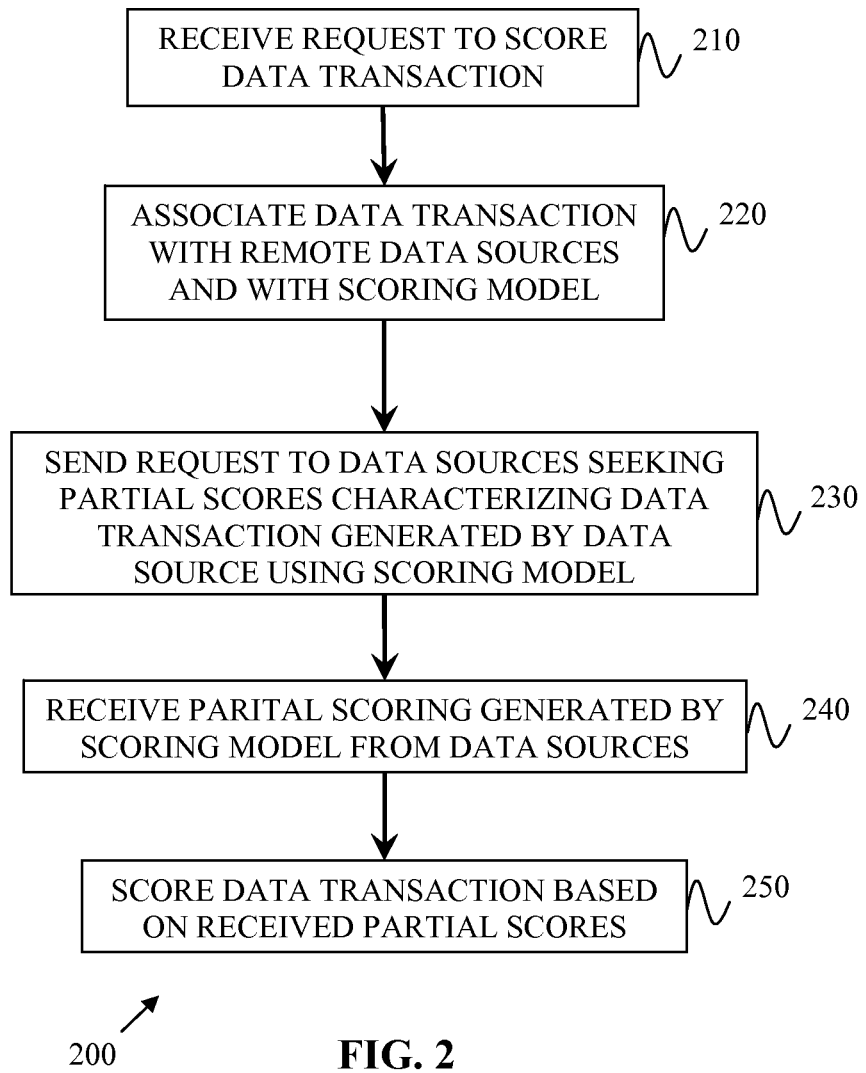
FIG. 2 is a process flow diagram illustrating a distributed scoring technique in which partial scores are generated by a plurality of data sources using a scoring model identified by a requesting entity.

FIG. 2 is a process flow diagram 200 in which, at 210, a request to score a transaction is received. Once this request is received, the transaction is associated, at 220, with a plurality of remote data sources and at least one scoring model. Thereafter, at 230, data is sent to the associated remote data sources that characterizes the data transaction, identifies the associated scoring model(s), and requests transmission of partial scores characterizing the data transaction generated by the scoring model(s). In response, at 240, partial scores are received from the associated remote data sources generated by the scoring model(s) so that, at 250, the data transaction can be scored based on the received partial scores. In some variations, more than one scoring model may be utilized so that data sources generate their partial scores using different scoring models.

Figure 3:
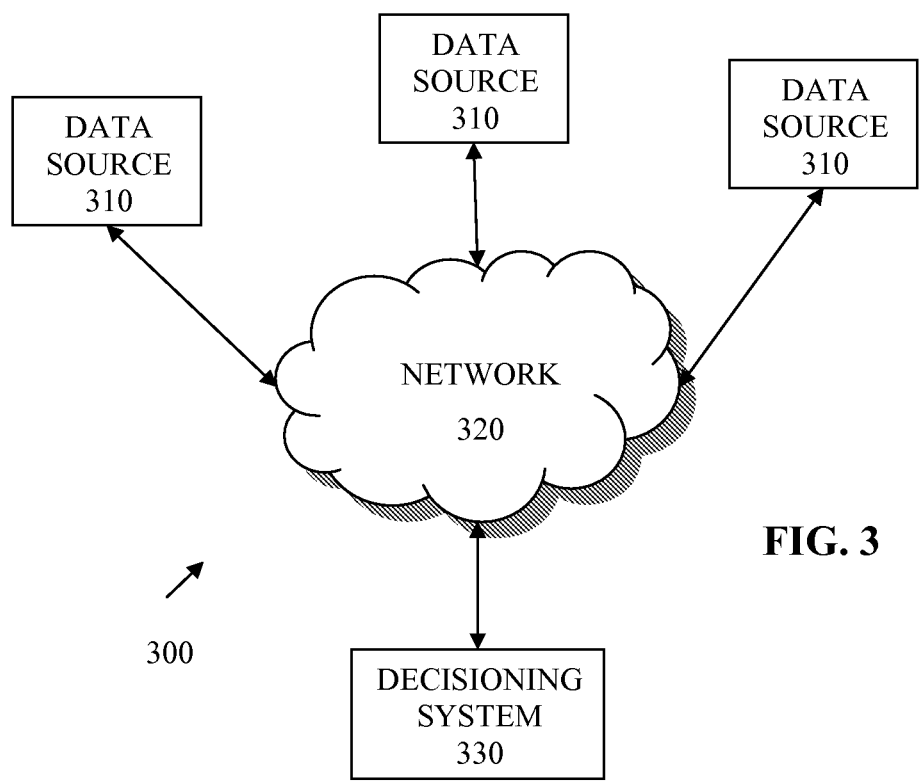
FIG. 3 is a first schematic diagram illustrating a decisioning system coupled to a plurality of data sources via a network.
Figure 4:
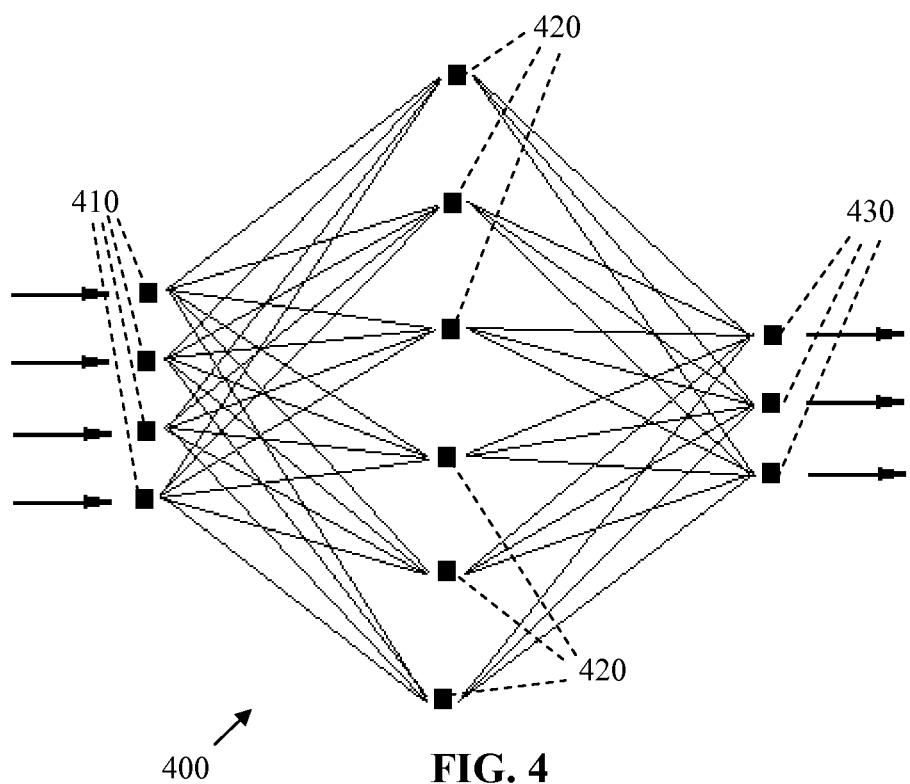
FIG. 4 is a schematic diagram illustrating a neural network-based decisioning system.

With reference to FIG. 3, a diagram 300 is illustrated in which a plurality of data sources 310 are coupled to a decisioning system 330 via a network 320. The decisioning system 330 may use information obtained from one or more of the data sources 310 to generate a score which characterizes an electronic data transaction, such as an electronic payment or a credit transaction. In addition, in some arrangements, the raw data utilized to generate the score may be sent to the decisioning system 330 by the data sources 310.

In some implementations utilizing a generalized linear model (e.g. scorecards, etc.) for scoring the data transaction, the score for the transaction is defined as Score=$f(\Sigma \chi_i)$ where $\chi_i$ is the partial score associated with each data source 310. With such an arrangement, the partial scores are separable by data source 310 so that no partial scores used by the decisioning system 330 are based on two or more data sources 310. In some variations, each data source 310 provides a single partial score (in the form of a number), thereby optimizing the compression and minimizing the bandwidth needed in the network 320.

Each data source 310 may include two or more scoring models associated with the decisioning system 330 so that each time the decisioning system 330 requests partial scores for a particular transaction, the decisioning system 330 also identifies the scoring model associated with the transaction. With this arrangement, segmented scoring techniques can be employed.

The decisioning system 330 can use a neural network scoring model (e.g., a back-propagation neural network model, etc.) in which the obtained partial scores are used as inputs into the hidden nodes of the model. This allows the score to capture nonlinear effects between the different data sources 310 while keeping each partial score dependent on a single data source 310 (thus allowing compression and minimum bandwidth over the network 320). With reference to FIG. 3, a diagram 400 illustrates a three-layer back-propagation neural network scoring model in which a first layer represents a series of input nodes 410 that correspond to the data sources 310. It will be appreciated that additional layers may be utilized. A second layer represents a layer of hidden nodes 420 with activation functions that are determined by the outputs of the input nodes 410 and in which there are weights on connections between the input nodes 410 and the hidden nodes 420. A third layer of output nodes 430, generate an output based on the activity of the hidden nodes 420 and weights on connections between the hidden nodes 420 and the output nodes 430. With reference to FIG. 2, the partial scores retrieved from the data sources 310 are inputs to the activation functions for the hidden nodes 420. Each data source 310 is thus reduced to a single number for each of the hidden nodes 420. By distributing the evaluation of the input nodes 410 and the corresponding connections to the hidden nodes 420, the required information transmitted over the network 320 is greatly reduced and a score can be more rapidly obtained while using fewer resources at the decisioning system.

The decisioning system 330 can also utilize support vector machines (SVMs) which are a set of related supervised learning methods used for classification and regression that belong to a family of generalized linear classifiers. SVMs can also be considered a special case of Tikhonov regularization. A special property of SVMs is that they simultaneously minimize the empirical classification error and maximize the geometric margin; hence they are also known as maximum margin classifiers.

Figure 5:
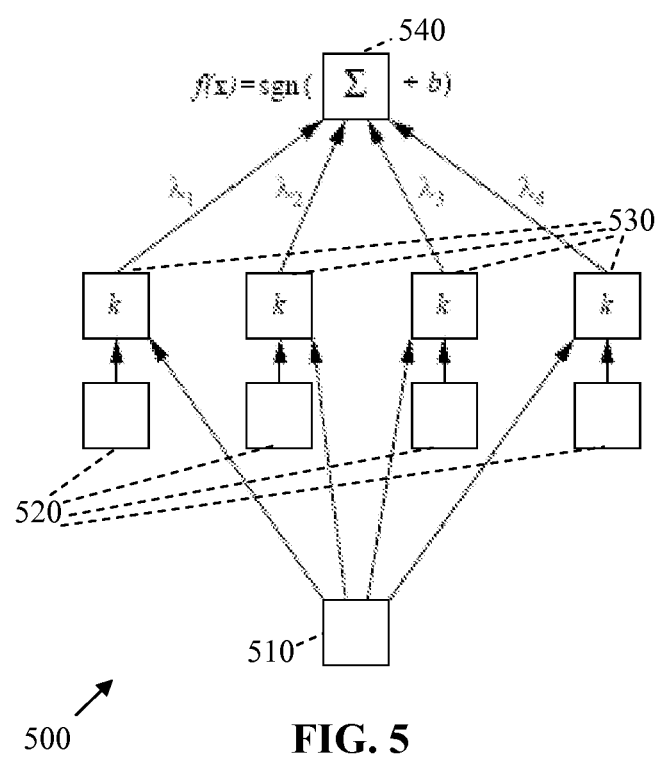
FIG. 5 is a schematic diagram illustrating a support vector machine-based decisioning system.

A sample SVM architecture 500 is illustrated in FIG. 5. An input vector x is provided to an input node 510. Thereafter, the input vector x is provided to a plurality of comparison nodes 530. The comparison nodes 530 are also coupled to support vector nodes 520 which receive support vectors $x_1 \ldots x_4$ as inputs. The comparison nodes 530 generates a comparison $k(x, x_i)$ of the input vector x and the corresponding support vector $x_i$. The comparisons from the comparison nodes 530 are weighted $\lambda_1$ to $\lambda_4$ and provided to a classification node 540. The output of the classification node 540 can be, for example, a score such as $f(x)=\text{sgn}(\Sigma \lambda_i \cdot k(x, x_i)+b)$. With the current arrangement, the partial scores received from the data sources 310 can be used to generate the output of the comparison nodes 530. For nonlinear kernels $k(x, x_i)$, each data source 310 must provide a partial score for each of the support vectors 520 (four in total for the example provided), as was necessary to provide the input to the activation functions of the hidden nodes in the case of neural networks. For a linear kernel, a single partial score is needed, reflecting the contribution of each data source 310 directly to the summation in $f(x)$ (as in the general linear model case). By distributing the evaluation of the input nodes 410 and the corresponding connections to the hidden nodes 420, the required information transmitted over the network 320 is greatly reduced and a score can be more rapidly obtained while using fewer resources at the decisioning system.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. For example, by distributing at least a portion of a scoring model to remote data sources, the amount of data transmitted from such data sources is significantly compressed. This compression reduces communication bandwidth consumption while leveraging the data sources' own processing resources to perform a significant fraction of the calculations need to turn their raw data into a model score. Moreover, the subject matter described herein is advantageous in that it can be used with a wide variety of scoring techniques using variables including, for example, scorecards, neural networks, support vector machines, and more.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. An article comprising a non-transitory machine-readable medium embodying instructions that when performed by one or more machines result in operations comprising:
    receiving a request to score a data transaction, the data transaction pertaining to a financial transaction;
    associating the data transaction with a plurality of remote data sources;
    polling each of the remote data sources to obtain partial scores characterizing the data transaction, the partial scores being generated by one of a plurality of decisioning systems associated with each respective data source, at least two of the partial scores being generated using different scoring models; and
    scoring the data transaction based on the obtained partial scores.

2. An article as in claim 1, wherein the data transaction is scored using a general linear model in which Score=f($\Sigma\chi_i$) where $\chi_i$ is the partial score associated with each data source.

3. An article as in claim 1, wherein the data transaction is scored using a neural network scoring model and the obtained partial scores populate activation functions of hidden nodes in the neural network scoring model.

4. An article as in claim 1, wherein the data transaction is scored using a support vector machine scoring model.

5. An article as in claim 1, wherein the data transaction is a payment card transaction.

6. An article as in claim 5, wherein the financial transaction characterizes creditworthiness of an entity.

7. An article as in claim 1, wherein the transaction is scored (i) after at least one partial score is received from the remote data sources and (ii) before all of the partial scores are received from the remote data sources.

8. An article as in claim 1, wherein a decisioning system scores the data transaction based on the obtained partial scores.

9. An article as in claim 1, wherein the article further embodies instructions that when performed by one or more machines result in operations comprising:
    receiving raw modeling data from at least one of the plurality of data sources; and
    comparing the partial scores generated by the data sources sending the raw modeling data with test values generated using the raw modeling data in order to verify the score.

10. A method for implementation by one or more data processors forming part of at least one computing system, the method comprising:
    receiving, by at least one data processor, a request to score a data transaction, the data transaction pertaining to a financial transaction;
    associating, by at least one data processor, the data transaction with a plurality of remote data sources;
    polling, by at least one data processor, each of the remote data sources to obtain partial scores characterizing the data transaction, the partial scores being generated by one of a plurality of decisioning systems associated with each respective data source; and
    scoring, by at least one data processor, the data transaction based on the obtained partial scores.

11. A method in claim 10, wherein the data transaction is scored using a general linear model in which Score=f($\Sigma\chi_i$) where $\chi_i$ is the partial score associated with each data source.

12. A method as in claim 10, wherein the data transaction is scored using a neural network scoring model, the neutral network scoring model comprising a first layer of input modes, a second layer of hidden nodes with activation functions that are determined by the input nodes and which are coupled to the input nodes by a first plurality of weighted connections, a third layer of output nodes that generate an output based on the activity of the hidden nodes and which are coupled to the hidden nodes by a second plurality of weighted connections; and wherein the obtained partial scores populate the activation functions of hidden nodes.

13. A method as in claim 10, wherein the data transaction is scored using a support vector machine scoring model.

14. A method as in claim 10, wherein the data transaction is a payment card transaction.

15. A method as in claim 14, wherein the financial transaction characterizes creditworthiness of an entity.

16. A method as in claim 10, wherein the transaction is scored (i) after at least one partial score is received from the remote data sources and (ii) before all of the partial scores are received from the remote data sources.

17. A method as in claim 10, wherein a decisioning system scores the data transaction based on the obtained partial scores.

18. A method as in claim 10 further comprising:
    receiving, by at least one data processor, raw modeling data from at least one of the plurality of data sources; and
    comparing, by at least one data processor, the partial scores generated by the data sources sending the raw modeling data with test values generated using the raw modeling data in order to verify the score.

19. An article comprising a non-transitory machine-readable medium embodying instructions that when performed by one or more machines result in operations comprising:
    receiving a request to score a data transaction;
    associating the data transaction with a plurality of remote data sources and at least one scoring model;
    sending data to the associated remote data sources characterizing the data transaction, identifying the at least one associated scoring model, and requesting transmission of partial scores characterizing the data transaction generated by the at least one associated scoring model, the partial scores being generated by one of a plurality of decisioning systems associated with each respective data source;
    receiving partial scores from the associated remote data sources generated by the at least one associated scoring model; and scoring the data transaction based on the received partial scores.

20. An article as in claim 19, wherein the transaction is scored before all of the partial scores are received from the remote data sources.

21. An article comprising a non-transitory machine-readable storage medium embodying instructions that when performed by one or more machines result in operations comprising:
    receiving a request to score a data transaction;
    associating the data transaction with a plurality of remote data sources;
    polling each of the remote data sources to obtain partial scores characterizing the data transaction;
    populating activation functions of hidden nodes in a neural network scoring model using the obtained partial scores to bypass input nodes in the neural network scoring model; and
    scoring the data transaction based on an output of the neural network scoring model.

22. An article comprising a non-transitory machine-readable storage medium embodying instructions that when performed by one or more machines result in operations comprising:
    receiving a request to score a data transaction;
    associating the data transaction with a plurality of remote data sources;
    polling each of the remote data sources to obtain partial scores characterizing the data transaction;
    using the obtained partial scores to generate outputs of comparison nodes in a support vector machine scoring model to bypass an input node in the neural network scoring model; and
    scoring the data transaction based on an output of the support vector machine scoring model.

23. A method for implementation by one or more data processors forming part of at least one computing system, the method comprising:
    receiving, by at least one data processor, a request to score a data transaction;
    associating, by at least one data processor, the data transaction with a plurality of remote data sources and at least one scoring model;
    sending, by at least one data processor, data to the associated remote data sources characterizing the data transaction, identifying the at least one associated scoring model, and requesting transmission of partial scores characterizing the data transaction generated by the at least one associated scoring model, the partial scores being generated by one of a plurality of decisioning systems associated with each respective data source;
    receiving, by at least one data processor, partial scores from the associated remote data sources generated by the at least one associated scoring model; and
    scoring, by at least one data processor, the data transaction based on the received partial scores.

24. A method for implementation by one or more data processors forming part of at least one computing system, the method comprising:
    receiving, by at least one data processor, a request to score a data transaction;
    associating, by at least one data processor, the data transaction with a plurality of remote data sources;
    polling, by at least one data processor, each of the remote data sources to obtain partial scores characterizing the data transaction;
    populating, by at least one data processor, activation functions of hidden nodes in a neural network scoring model using the obtained partial scores to bypass input nodes in the neural network scoring model; and
    scoring, by at least one data processor, the data transaction based on an output of the neural network scoring model.

25. A method for implementation by one or more data processors forming part of at least one computing system, the method comprising:
    receiving, by at least one data processor, a request to score a data transaction;
    associating, by at least one data processor, the data transaction with a plurality of remote data sources;
    polling, by at least one data processor, each of the remote data sources to obtain partial scores characterizing the data transaction;
    using, by at least one data processor, the obtained partial scores to generate outputs of comparison nodes in a support vector machine scoring model to bypass an input node in the vector machine scoring model; and
    scoring, by at least one data processor, the data transaction based on an output of the support vector machine scoring model.

* * * * *